July 4, 1939.  R. STAGL  2,165,158
TELESCOPE
Original Filed Oct. 2, 1935  2 Sheets-Sheet 1
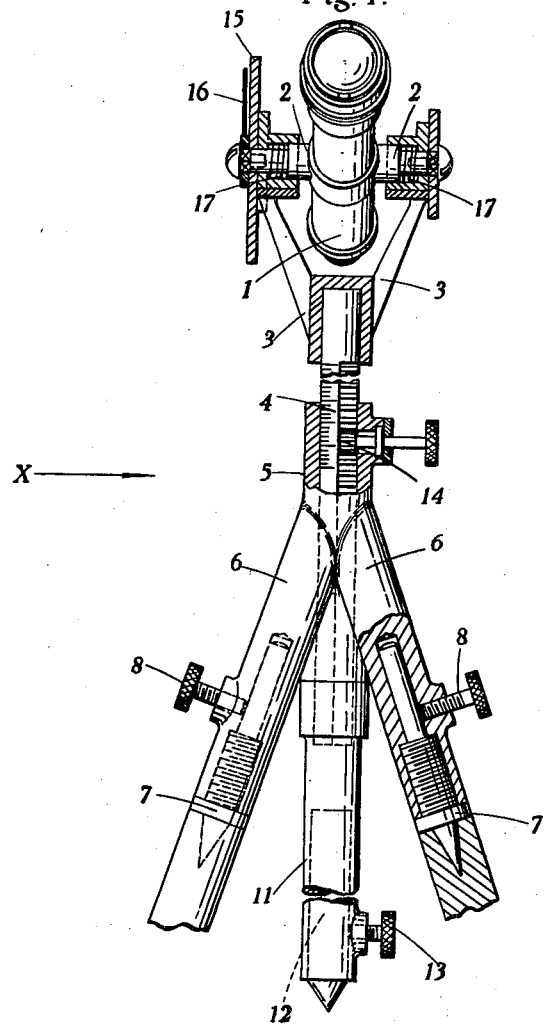

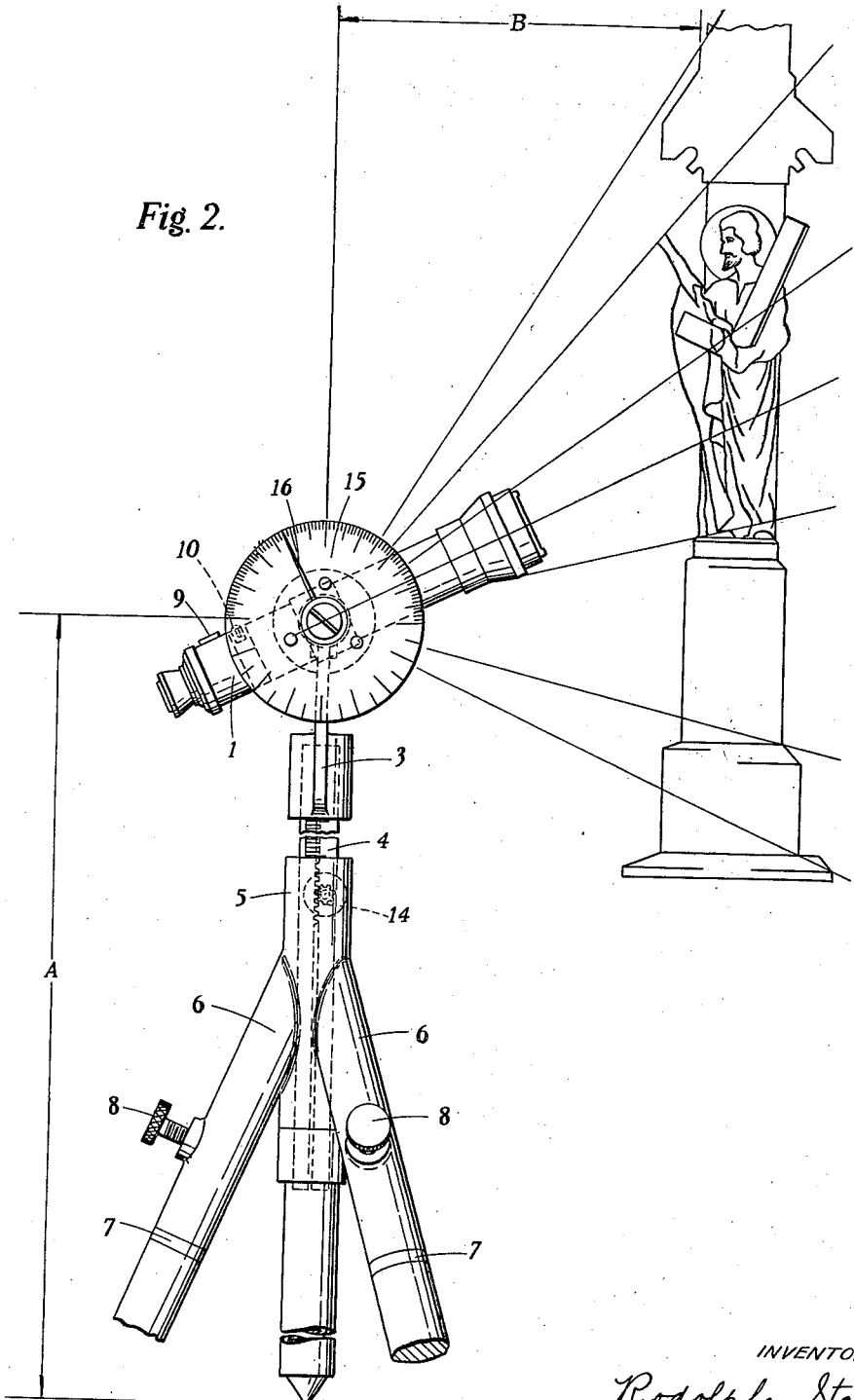

Patented July 4, 1939

2,165,158

UNITED STATES PATENT OFFICE 2,165,158

TELESCOPE

Rodolphe Stagl, Brussels, Belgium

Original application October 2, 1935, Serial No. 43,282. Divided and this application November 15, 1937, Serial No. 174,724. In Germany October 2, 1934

2 Claims. (Cl. 33—70)

This invention relates to a device for use by architects, sculptors and the like in designing statues and reliefs which are to be viewed from a height different from that at which they are to be placed.

The device in accordance with the invention comprises a telescope mounted for pivotal movement and for reciprocation in the vertical plane, means for indicating the height of the pivotal axis of the telescope and means for indicating the angular position of the telescope.

In order that the invention may be properly understood and be more readily carried into effect, an example of construction in accordance therewith will now be described with reference to the accompanying drawings, in which:

Figure 1 is an elevation, partly in section, of the device, and

Figure 2 is a side elevation of the device of Figure 1 and illustrates the method of using the device.

The device comprises a telescope 1 mounted on trunnions 2 in a fork 3 on the end of a graduated rod 4 which passes through the head of a tripod 5. The length of each leg 6 of the tripod is adjustable by means of a screw 7 and the two parts of each leg can be fixed when set by a screw 8.

The device is set up with the turning axis horizontal by adjusting the legs 6 and testing by means of the bubble levels 9 and 10 on the telescope. Depending from the head of the tripod, there is a tube 11 within which is arranged to slide a rod 12, the length of which is known. When the tripod has been set, this rod 12 is slid down until its lower end just touches the ground. It is then fixed by means of the screw 13. The graduated rod 4 on which the telescope is mounted is then brought down by the rack and pinion device 14 until its lower end rests on the top of the rod 12. The height of the turning axis of the telescope can then be read off the graduations on the rod 4. The tripod will be set so that when the rod 4 rests on the rod 12, the telescope is still too low. By means of the rack and pinion device 14, the telescope can then be lifted so that its turning axis is at the desired height. The scale markings on the tube 4 can be such as to indicate directly the height of the turning axis.

One branch of the fork 3 has a graduated dial 15 fixed to it and the trunnion 2 at that end has a pointer 16 fixed to it so that the various angular positions of the telescope can be read off. Two springs 17 arranged in the telescope bearings serve to hold the telescope in any position into which it has been set.

In Figure 2, the telescope device is shown in use. It is mounted with its turning axis at a height A from the ground with its vertical axis at a distance B from the statue seen on the right. The telescope is thus set in the position from which the statue is to be viewed. By sighting the telescope on to different parts of the statue, one can determine the proper slopes which those parts should have in order that the statue may have a harmonius appearance. These slopes are indicated by heavy lines in the figure. They can be read off the dial 15 and the dial readings can be used to set the cutter of a clay cutting device such as is set forth in my application Serial No. 43,282 filed October 2, 1935.

The present application is a division of my copending application Serial No. 43,282 filed October 2, 1935.

I claim:

1. A device for use by architects, sculptors and the like comprising a tripod having supporting legs of adjustable length and a fourth leg extensible into contact with the ground between said supporting legs, a telescope, a vertically slidable support for said telescope mounting the same to turn about a horizontal axis, means for lifting and lowering said support into and out of contact with said fourth leg, a dial fixed to said support and centered on said horizontal axis, and indicating means fixed to said telescope to move over said dial.

2. A device for use by architects, sculptors and the like comprising a tripod having a head, three supporting legs of adjustable length and a tubular leg vertically slidable and of adjustable length depending from said head between said legs, a telescope, a support for said telescope mounting the same to turn about a horizontal axis through a substantial angle both above and below said axis and passing through said head and into said tubular leg, means for moving said support up and down through said head, a step within said leg limiting the downward movement of said support, means on said support for indicating the height of said horizontal axis when said support is in contact with said step, a dial fixed to said support and centered on said axis and immovable relatively thereto, and means fixed to said telescope for indicating on said dial the angular position of said telescope.

RODOLPHE STAGL.